(12) United States Patent
Gravel et al.

(10) Patent No.: US 8,103,259 B2
(45) Date of Patent: Jan. 24, 2012

(54) SYSTEM AND METHOD FOR OPTIMISATION OF MEDIA OBJECTS

(75) Inventors: Vivianne Gravel, Longueuil (CA);
François Gagnon, Lachine (CA);
Francis Beaulieu, Montreal (CA);
Benoit Châtelain, Rosemère (CA);
Olivier Munger, St-Rédempteur (CA)

(73) Assignee: Lipso Systemes Inc., Montreal (CA)

( * ) Notice: Subject to any disclaimer, the term of this patent is extended or adjusted under 35 U.S.C. 154(b) by 1009 days.

(21) Appl. No.: 12/001,121

(22) Filed: Dec. 10, 2007

(65) Prior Publication Data

US 2008/0176543 A1      Jul. 24, 2008

Related U.S. Application Data

(60) Provisional application No. 60/869,213, filed on Dec. 8, 2006.

(51) Int. Cl.
*H04M 3/42* (2006.01)
(52) U.S. Cl. .............. 455/414.2; 455/466; 455/418; 709/246; 709/206; 709/223
(58) Field of Classification Search ............... 455/414.2, 455/415, 466, 418; 709/246, 206, 223
See application file for complete search history.

(56) References Cited

U.S. PATENT DOCUMENTS

| | | | |
|---|---|---|---|
| 5,524,137 A | 6/1996 | Rhee | |
| 5,727,159 A | 3/1998 | Kikinis | |
| 5,764,235 A | 6/1998 | Hunt et al. | |
| 5,848,415 A | 12/1998 | Guck | |
| 5,928,325 A | 7/1999 | Shaughnessy et al. | |
| 6,035,339 A | 3/2000 | Agraharam et al. | |
| 6,138,156 A | 10/2000 | Fletcher et al. | |
| 6,161,114 A | 12/2000 | King et al. | |
| 6,185,625 B1 | 2/2001 | Tso et al. | |
| 6,275,692 B1 | 8/2001 | Skog | |
| 6,421,707 B1 | 7/2002 | Miller et al. | |
| 6,424,841 B1 | 7/2002 | Gustafsson | |
| 6,430,161 B2 | 8/2002 | Uemura et al. | |
| 6,457,030 B1 | 9/2002 | Adams et al. | |
| 6,556,217 B1 | 4/2003 | Mäkipää et al. | |

(Continued)

FOREIGN PATENT DOCUMENTS

CA          2409327 A1      4/2003
(Continued)

OTHER PUBLICATIONS

3GPP2, 3rd Generation Partnership Project 2, Multimedia Messaging Services (MMS), Version 1.0, Oct. 30, 2002.

(Continued)

*Primary Examiner* — Charles Shedrick
(74) *Attorney, Agent, or Firm* — Goudreau Gage Dubuc; Hugh Mansfield

(57) ABSTRACT

A system and method for optimization of media objects for delivery to one of a plurality of mobile communication devices of different types and rendering thereon. In particular, the media objects are optimised according to the mobile device's characteristics to ensure efficient delivery and optimal rendering thereon. For this purpose, an optimised output of the media object is determined at a first stage. At a subsequent stage, based on the mobile device type, the characteristics of the object to be delivered are then adjusted to conform to those of the predetermined optimised output, thus ensuring that the rendering of the optimised media object on the mobile device output is of high quality.

21 Claims, 5 Drawing Sheets

U.S. PATENT DOCUMENTS

| | | | |
|---|---|---|---|
| 6,736,322 | B2 | 5/2004 | Gobburu et al. |
| 6,862,046 | B2 | 3/2005 | Ko |
| 7,240,036 | B1 | 7/2007 | Mamdani et al. |
| 7,260,261 | B2 | 8/2007 | Xie et al. |
| 7,284,046 | B1 * | 10/2007 | Kreiner et al. ............... 709/223 |
| 7,610,045 | B2 * | 10/2009 | Little et al. .................... 455/418 |
| 2001/0047517 | A1 | 11/2001 | Christopoulos et al. |
| 2001/0054087 | A1 | 12/2001 | Flom et al. |
| 2002/0023027 | A1 | 2/2002 | Simonds |
| 2002/0025798 | A1 | 2/2002 | Titmuss et al. |
| 2002/0032751 | A1 | 3/2002 | Bharadwaj |
| 2002/0042743 | A1 | 4/2002 | Ortiz et al. |
| 2002/0046262 | A1 | 4/2002 | Heilig et al. |
| 2002/0087549 | A1 | 7/2002 | Mostafa |
| 2002/0091569 | A1 | 7/2002 | Kitaura et al. |
| 2002/0091571 | A1 | 7/2002 | Thomas et al. |
| 2002/0102966 | A1 | 8/2002 | Lev et al. |
| 2002/0129006 | A1 | 9/2002 | Emmett et al. |
| 2003/0022659 | A1 * | 1/2003 | Mun et al. .................... 455/415 |
| 2003/0115152 | A1 | 6/2003 | Flaherty |
| 2003/0230630 | A1 | 12/2003 | Whipple et al. |
| 2004/0099741 | A1 * | 5/2004 | Dorai et al. ............. 235/462.08 |
| 2005/0096870 | A1 | 5/2005 | Butler |
| 2005/0159136 | A1 | 7/2005 | Rouse et al. |
| 2006/0223503 | A1 * | 10/2006 | Muhonen et al. .......... 455/414.1 |
| 2007/0088852 | A1 * | 4/2007 | Levkovitz .................... 709/246 |
| 2007/0213077 | A1 * | 9/2007 | Mian et al. ................... 455/466 |

FOREIGN PATENT DOCUMENTS

| | | |
|---|---|---|
| EP | 0 713 198 A2 | 5/1996 |
| EP | 1 043 671 A2 | 10/2000 |
| EP | 1 091 601 A2 | 4/2001 |
| EP | 1 178 421 A2 | 2/2002 |
| EP | 1 480 476 A1 | 11/2004 |
| EP | 1543456 A1 | 6/2005 |
| FR | 2 867 650 A1 | 9/2005 |
| FR | 2 873 217 A1 | 1/2006 |
| GB | 2 362 012 A | 11/2001 |
| GB | 2 405 768 A | 3/2005 |
| GB | 2 420 894 A | 6/2006 |
| WO | WO-98/15091 A1 | 4/1998 |
| WO | WO-99/66746 A2 | 12/1999 |
| WO | WO-01/59706 A1 | 8/2001 |
| WO | WO 01/60009 A2 | 8/2001 |
| WO | WO-01/63533 A2 | 8/2001 |
| WO | WO-01/80047 A2 | 10/2001 |
| WO | WO-01/89171 A2 | 11/2001 |
| WO | WO-01/93097 A2 | 12/2001 |
| WO | WO-01/93120 A1 | 12/2001 |
| WO | WO-01/95267 A1 | 12/2001 |
| WO | WO-02/06992 A2 | 1/2002 |
| WO | WO-02/15604 A2 | 2/2002 |
| WO | WO 02/41579 A1 | 5/2002 |
| WO | WO-02/42872 A2 | 5/2002 |
| WO | WO-02/052730 A1 | 7/2002 |
| WO | WO-02/059761 A1 | 8/2002 |
| WO | WO-02/076077 A1 | 9/2002 |
| WO | WO-02/087135 A2 | 10/2002 |
| WO | WO-02/097677 A2 | 12/2002 |
| WO | WO-03/001770 A2 | 1/2003 |
| WO | WO 2004/027662 A1 | 4/2004 |
| WO | 2006/128094 | 11/2006 |

OTHER PUBLICATIONS

3GPP TS 23.010 V5.5.0 (Sep. 2002), 3rd Generation Partnership Project; Technical Specification Group Terminals . . . , 3GPP, 2002.

Chandra et al., Application-Level Differentiated Multimedia Web Services Using Quality Aware . . . , IEEE Journal on Selected Areas in Communications, vol. 18, No. 12, Dec. 2000.

ETSI TS 122 140 V5.2.0 (Jun. 2002), Universal Mobile Telecomminications System (UMTS) . . . , 3GPP, 2002.

ETSI TS 123 140 V5.2.0 (Mar. 2002), Digital Cellular Telecommunications System (Phase 2+) (GSM) . . . , 3GPP, 2002.

Forstadius et al., XML in Dynamic Multimedia Content Management, Nordic Interactive Conference 2001, Copenhagen, Denmark.

Fox et al., Adapting to Network and Client Variation Using Infrastructural Proxies: Lessons and Perspectives, IEEE Personal Communications, Aug. 1998.

Gaddah et al., Image Transcoding Proxy for Mobile Internet Access, Vehicular Technology Conference, Fall 2002, IEEE 56th.

Han et al., Dynamic Adaptation in an Image Transcoding Proxy for Mobile Web Browsing, IEEE Personal Communications, Aug. 1998.

Lamaire et al., Adapting to Network and Client Variability, IEEE Personal Communications, Aug. 1998.

Le Bodic, Multimedia Messaging Service, an Engineering Approach to MMS, John Wiley & Sons Limited, 2003.

Lemlouma et al., A Framework for Media Resources Manipulation in an Adaptation and Negotation Architecture, Opera Project, INRIA, Aug. 2001.

Lemlouma et al., Device Independent Principles for Adapted Content Delivery, Oct. 2002, INRIA Rhône Alpes, France.

Lemlouma et al., NAC: A Basic Core for the Adaptation and Negotiation of Multimedia Services, Opera Project, INRIA, Sep. 2001.

Lemlouma et al., Universal Profiling for Content Negotiation and Adaptation, Opera Project, INRIA Rhônes-Alpes, France, Mar. 5, 2002.

Lemlouma et al., Universal Profiling for Content Negotiation and Adaptation in Heterogeneous Environments, W3C Delivery Context Workshop, Mar. 4-5, 2002, W3C/INRIA, S-A, France.

Maheshwari et al., TranSquid: Transcoding and Caching Proxy for Heterogenous E-Commerce Environments, Proceedings of the 12th Int'l Wrkshp on Research Issues . . . , IEEE 2002.

Metso et al., Content Model for Mobile Adaptation of Multimedia Information, Journal of VLSI Signal Processing Systems, vol. 29 Issue 1/2, Aug.-Sep. 2001.

Metso et al., The Media Wrapper in the Adaptation of Multimedia Content for Mobile Environments, Proceedings of SPIE, The Intl Society for Optical Eng., vol. 4209, 2001.

Nagao et al., Semantic Annotation and Transcoding: Making Wed Content More Accessible, IEEE Multimedia, Apr.-Jun. 2001.

Smith et al., Transcoding Internet Content for Heterogeneous Client Devices, Proc. IEEE Int. Conf. on Circuits and Syst. (ISCAS), May 1998.

Vetro et al., Complexity-Quality Analysis of Transcoding Architectures for Reduced Spatial Resolution, IEEE Transactions on Consumer Electronics, vol. 48, No. 3, Aug. 2002.

Vetro et al., Object-Based Transcoding for Adaptable Video Content Delivery, IEEE, Transactions on Circuits and Systems for Video Technology, vol. 11, No. 3, Mar. 2001.

WAP MMS Archichecture Overview, Version Apr. 25, 2001, Wireless Application Protocol Multimedia Messaging Service . . . , WAP Forum, 2001.

WAG UAProf, Version Oct. 20, 2001, Wireless Application Protocol, WAP-248-UAPROF-2001020-A, WAP Forum, 2001.

Warabino et al., Video Transcoding Proxy for 3Gwireless Mobile Internet Access, IEEE Communications Magazine, Oct. 2000.

Zhang, Adaptive Content Delivery: A New Application Area for Media Computing Research, Microsoft Research, China, Jan. 2000.

* cited by examiner

SYSTEM AND METHOD FOR OPTIMISATION OF MEDIA OBJECTS

CROSS REFERENCE TO RELATED APPLICATIONS

This application claims priority on U.S. Provisional Application No. 60/869,213, filed on Dec. 8, 2006 and which is herein incorporated by reference in its entirety.

FIELD OF THE INVENTION

The present invention relates to a system and method for optimisation of media objects. In particular generating optimised objects for efficient delivery to a mobile communication device according to the device's characteristics.

BACKGROUND OF THE INVENTION

Most mobile devices have multimedia and wireless Internet capabilities, thus being capable of displaying high quality colour images, as well as rendering audio and video clips. As a result, they are used in a variety of consumer applications, in which rich content messages comprising an object such as an image, video or audio clip, are delivered to the mobile device. For instance, mobile devices may be used by a consumer to purchase a video from a retailer's website, the video being subsequently delivered to the device. However, given the plurality of available device types having different technical capabilities, some content may be featured adequately on one type of device while it is not featured as well on another. In order to ensure that the object is rendered with high quality on the mobile device, thus enhancing the consumer's experience, it is therefore desirable for the object to be optimised for the specific device it is transmitted to.

The prior art discloses altering media objects, such as image, video, or audio objects, based on known mobile device characteristics prior to transmission to the mobile device over a wireless connection. Typically, the object is modified (e.g. resized) in order to match the technical limitations of the device, thus ensuring that once delivered, it can be readily rendered on the mobile device without error, distortion, or the like. In particular, a plurality of objects having different characteristics is generated and the object, which is sent to the receiving device is the one whose characteristics are the closest to that of the device. However, none of the optimisation techniques known in the art teach optimising a given object in order to match the technical limitations of the receiving device as well as to improve the level of quality of the featured object as perceived by the user of the device.

What is therefore needed, and an object of the present invention, is a system that dynamically generates an object, which enhances the quality of the experience of the mobile device's user as perceived by the latter.

SUMMARY OF THE INVENTION

More specifically, in accordance with the present invention, there is provided a method for preparing and delivering a media object of a category of media object to a selected one of a plurality of mobile devices, each of the mobile devices of a different mobile device type and comprising an output. The method comprises at a first stage, for each type of mobile device, determining an optimised output of the category of media object when the category of media object is rendered on the output of the type of device; at a subsequent stage, retrieving the mobile device type of the selected mobile device; optimising the media object based on the retrieved mobile device type and according to the determined optimised output for the category of the media object; delivering the optimised media object to the selected mobile device; and rendering the optimised media object on the mobile device output.

In accordance with the present invention, there is also provided a system for preparing and delivering a media object of one of a plurality of categories of media objects to a selected one of a plurality of mobile devices, each of the mobile devices of one of a plurality of mobile device types and comprising an output for rendering at least one of the category of media objects. The system comprises a plurality of optimised outputs for each of the categories of media objects, each of the optimised outputs associated with a respective mobile device type; an optimisation module, the module receiving the media object, retrieving the optimised output based on a mobile device type of the selected mobile device and the category of media object and optimising the media object based on the retrieved optimised output; and a wireless communication link connecting the plurality of mobile devices to the optimisation module for delivering the optimised media object to the selected mobile device.

Still in accordance with the present invention, there is also provided a method for preparing and delivering a barcode image from a data set for subsequent delivery to a receiving one of a plurality of different types of mobile devices for scanning with a scanning one of a plurality of different types of barcode scanning devices, the mobile devices each comprising a display for displaying the barcode image and the scanning devices each comprising a scanner for reading the image. The method comprises at a first stage, for each type of mobile device, determining an optimised output of the barcode image when the barcode image is displayed on the display of the type of mobile device; at a subsequent stage, retrieving the mobile device type of the receiving mobile device and a configuration of the scanning one of the plurality of scanning devices; optimising the barcode image based on the retrieved mobile device type and the scanning device configuration according to the determined optimised output of the barcode image; delivering the optimised barcode image to the receiving mobile device; and displaying the optimised barcode image on the display of the receiving device.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 1:
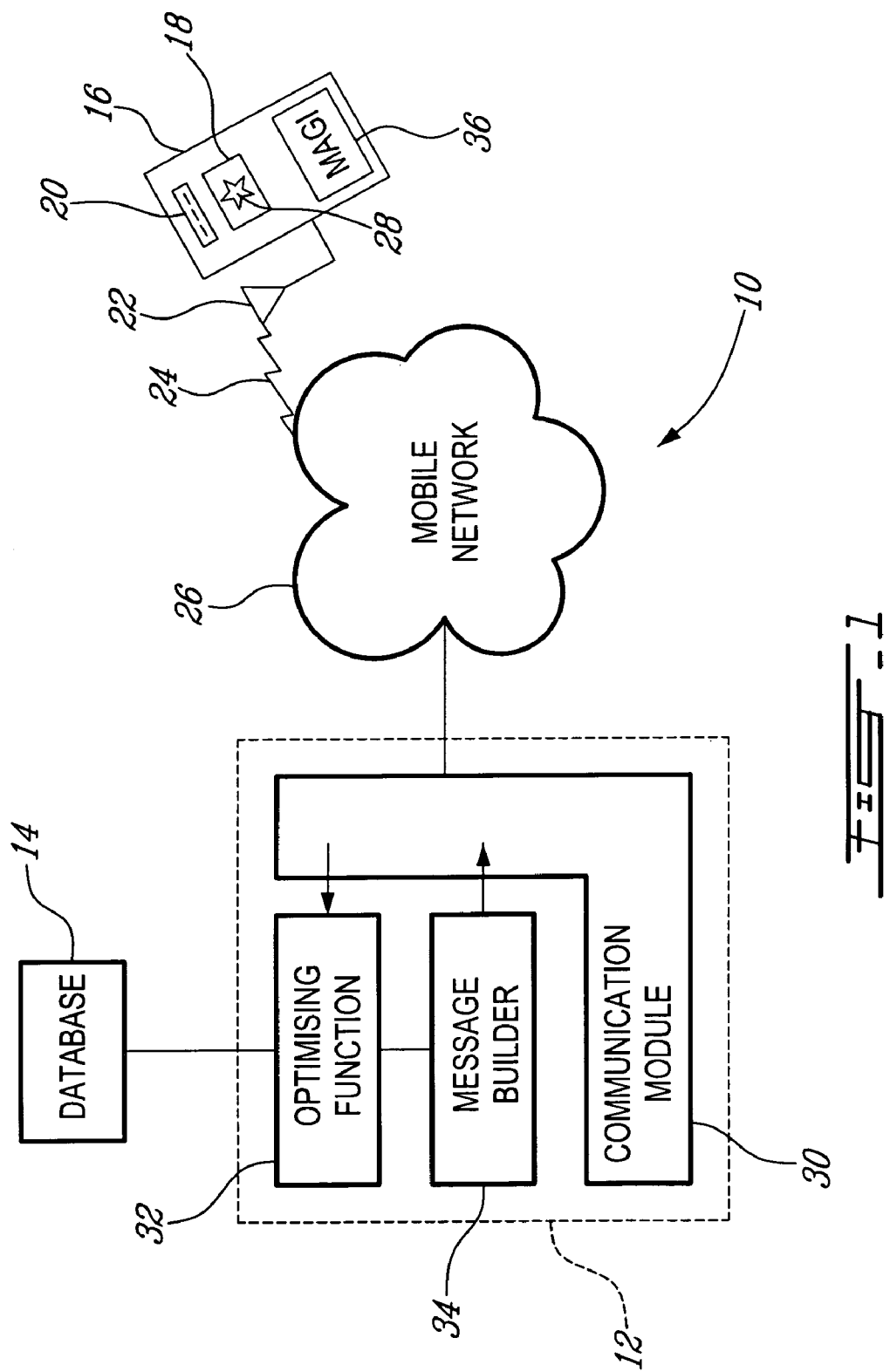
FIG. 1 is a schematic diagram of a system for generating an optimised media object for transmission to a mobile device and rendering on the device in accordance with an illustrative embodiment of the present invention.

Referring now to FIG. 1, and in accordance with an illustrative embodiment of the present invention, a system for generating an optimised object, generally referred to using the reference numeral 10, will now be described. The ground portion of the system 10 comprises a fixed base or server 12 connected to a database 14, which reads and writes data to storage according to instructions of the server 12. The mobile portion of the system 10 comprises a mobile device 16 comprising an output such as a display 18 for displaying images, videos, and the like delivered to the mobile device 16 and a speaker 20, for rendering audio sequences. The mobile device 16 further comprises an antenna 22 and a Radio Frequency (RF) link 24 via which it communicates with a mobile network 26 and the server 12. The server 12 optimises a media object 28 of a given category (e.g. image as illustrated in FIG. 1, coupon, ticket, audio or video sequence) to be transmitted to the mobile device 16. The server 12 is composed of a communication module 30 for managing exchanges, an optimising function 32 for optimising the object 28, and a message builder 34 for generating a message (not shown) containing the optimised object 28. Illustratively, the present illustrative embodiment takes advantage of e-mail in order to transmit the object message to the mobile device 16, which further comprises a Mail Agent Interface (MAGI) 36 for filtering incoming e-mail messages and extracting messages, which include the object 28.

Figure 2:
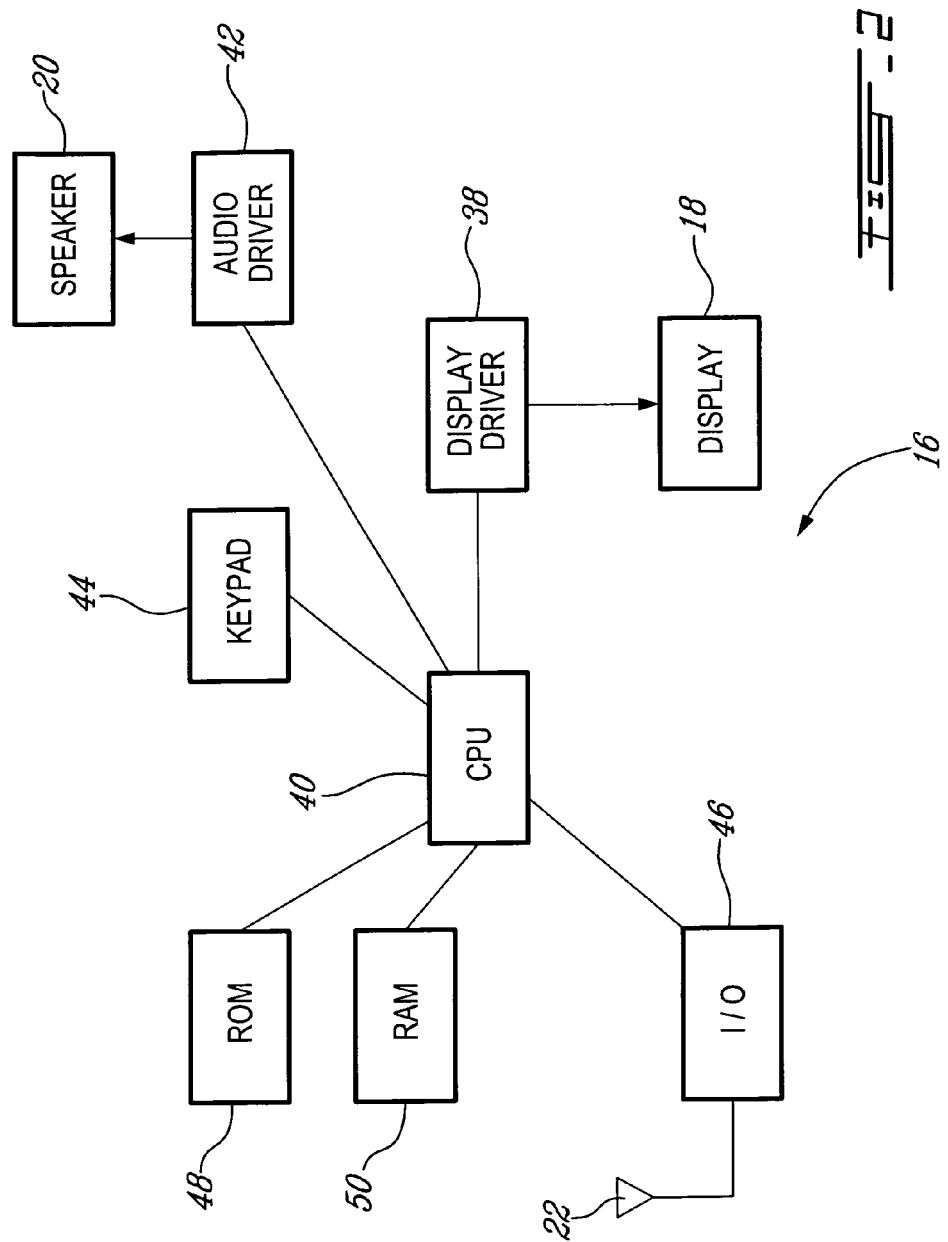
FIG. 2 is a schematic diagram of the mobile device in accordance with an illustrative embodiment of the present invention.

Referring now to FIG. 2 in addition to FIG. 1, the display 18 of the mobile device 16 includes a display panel, illustratively a Liquid Crystal Display (LCD) or the like, and image processing circuitry such as a display driver 38 which is under control of a Central Processing Unit (CPU) 40 (or other controller). The mobile device 16 also typically comprises audio or speech processing circuitry such as an audio driver 42, which is also under control of the CPU 40, for rendering the audio component of an object as in 28. Typically a keypad 44 or similar user interface is also provided. In order for the mobile device 16 to access the mobile network 26, an I/O interface 46 coupled to the antenna 22 is provided. Memory such as ROM 48 and/or RAM 50 comprising the requisite instructions and data (not shown) for ensuring correct operation of the mobile device 16 is also provided. Exemplary versions of such mobile communication devices include cellular phones and Personal Digital Assistants (PDAs).

Figure 3:
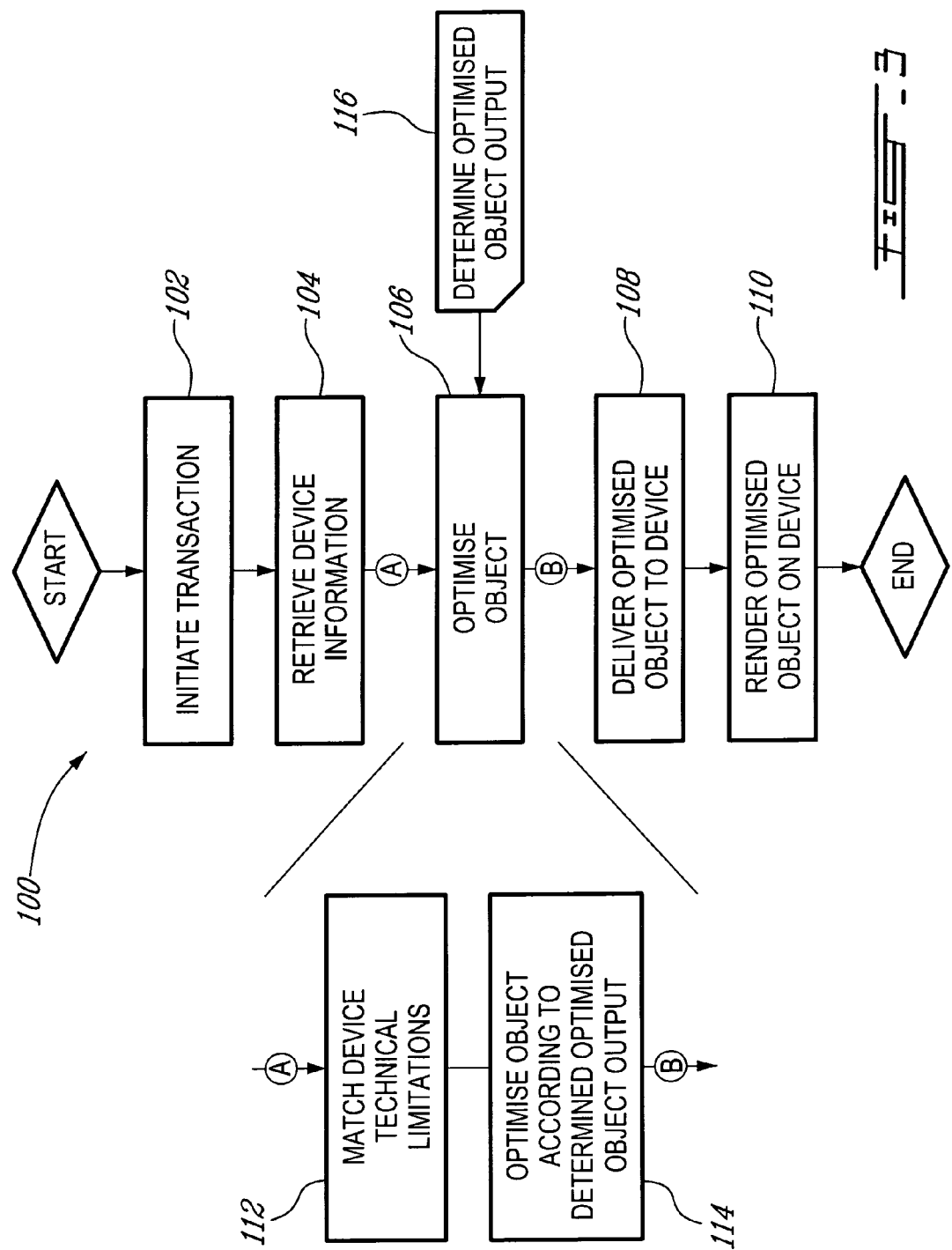
FIG. 3 is a flowchart of the media object optimisation process in accordance with an illustrative embodiment of the present invention.

Referring now to FIG. 3 in addition to FIG. 1, the sequence 100 of the object optimisation process will now be described. At step 102, a user of the mobile device 16 typically initiates a transaction by accessing a retailer's website (not shown) via the mobile network 26 and purchasing an object as in 28 from the website. For this purpose, the user selects the desired object 28 (using suitable interactive means) and subsequently proceeds with payment using one of many conventional methods accepted at the retailer's website (e.g. credit card or existing user account). As will be apparent to a person skilled in the art, the object 28 illustratively belongs to one of a plurality of media object categories (e.g. image, audio, video, barcode image, coupon . . . ) as well as any possible combinations of these categories. Once the transaction is completed, the selected object 28 is typically delivered to the mobile device 16 for rendering on the latter.

Taking advantage of the method of the present invention, once the transaction is completed, the server 12 retrieves information related to the mobile device 16 from the database 14 (step 104) in order to ensure that the object 28 will be optimised at step 108 for the specific mobile device 16 (step 106) prior to delivery thereto via the mobile network 26 (step 108). Once the optimised object 28 has been delivered to the mobile device 16, it is rendered thereon at step 110 (i.e. outputted on the display 18 and/or the speakers 20 depending on whether the category of the object 28). In order to ensure that the object 28 is perceived by the user as having a high quality level, it is desirable not only to make necessary adjustments to the object 28 (step 112) so as to match the device's technical limitations, but also to optimise attributes, which will affect the manner in which the user perceives the object 28, thus enhancing the quality of the user's experience (step 114). For this purpose and as will be described in further detail herein below, the server 12 illustratively initially determines an optimised output, which is outputted by a given mobile device 16 when a media object 28 of a given category and having certain attributes is rendered thereon (step 116). When subsequently optimising the object 28, the attributes of the object 28 intended for delivery are illustratively adjusted to match the attributes of the object, which resulted in the predetermined optimised output (step 114). This ensures that the server 12 delivers an object 28, which is perceived by the user as being of better quality (e.g. image or sound quality) than a non-optimised version of the same when rendered on the specific mobile device 16 it has been delivered to.

Still referring to FIG. 3 in addition to FIG. 1, attributes related to the type of the mobile device 16, which are stored in the database 14 at step 104 for subsequent use by an optimisation algorithm invoked by the optimising function 32 during the object optimisation process illustratively include display resolution (in pixels), display size (in mm), display technology and type (e.g. Liquid Crystal Display (LCD), Organic Electro Luminescence (OEL), Organic Light Emitting Diode (OLED), tactile . . . ), and speaker type, frequency response, and placement. Other attributes may include the operating system used to drive the device 16 (especially for PDAs), colours that can be displayed if any (i.e. monochrome or otherwise colour depth), sampling frequency, frame rate, type of audio and visualization software, i.e. types of codecs supported (e.g. jpeg, gif, mpeg, mov, mp3, wav . . . ), and types of communication interfaces and protocols supported (e.g. Wireless Application Protocol (WAP), HTML, Java Mobile Information Device Profile (MIDP), Bluetooth . . . ).

It is apparent that most of these attributes constitute technical limitations, which can be overcome by making necessary adjustments to the object 28 prior to transmission to the mobile device 16 (step 112), thus maintaining and possibly enhancing the quality of the object data and preventing distortions during transmission. For this purpose, the server 12 retrieves this information from the database 14 in order to ensure that the object 28 delivered matches these device limitations. For example, the server 12 may adjust the attributes of the object 28 such that it delivers an object 28 having an acceptable format, which conforms to one of the codec formats supported by the mobile device 16. Also, the object 28 could be adapted to match the size and resolution of the display 18 by for example resizing it so that it can fit the display 18 of the mobile device 16 and be readily rendered thereon.

Still referring to FIG. 3 in addition to FIG. 1, besides matching the technical limitations of the mobile device 16, the optimisation algorithm within the optimising function 32 illustratively adjusts a plurality of attributes of the media object 28, which affect the quality of the object's output as perceived by the user when it is rendered on the mobile device 16 (step 114). A number of optimisation algorithms, such as simple gradient descent and brut force method where every parameter variation is tried sequentially, may be used. Other algorithms such as Newton, quasi-Newton, simulated-annealing, genetic, and ant colony may alternatively be used for cases where the number and type of parameter variation has a complex influence on the metric to be optimised. As will be apparent to a person skilled in the art, the user, which perceives the media object 28 is not limited to a human being viewing and/or listening to the object 28 (e.g. a video object) but may also comprise machines, which sense the output rendered on the mobile device 16 for a variety of generic types of applications. In particular, for audio-based applications, the user may illustratively be a microphone (not shown), which senses the sound outputted by the mobile device 16 for identification purposes or subsequent transmission, for example. For image-based applications, the user may illustratively be a camera (not shown), which captures the image displayed on the mobile device display 18 for identification purposes for instance. In a specific embodiment of image-based applications and as will be described in further detail herein below, the user may be a scanning device, which reads a barcode image displayed on the display 18 for subsequent use in a plurality of consumer applications such as retail coupon and ticket applications. Moreover, it will be apparent to a person skilled in the art that the media object 28 could be optimised for a generic type of user (e.g. a human being) but also for a specific type of user (e.g. a barcode image optimised for accurate reading by a specific type of scanning device).

A plurality of factors affect audio results, which is typically of moderate quality especially when audio objects are outputted on mobile devices as in 16. Indeed, the technical limitations (e.g. device chipset, speaker bandwidth) of the mobile device combined with other factors such as the shape of the device's housing, the number and positioning (e.g. at the front or on the back of the mobile device 16) of the device's audio output (i.e. the speaker), and the type of audio object delivered (e.g. speech, music, ring) to the mobile device 16 can limit audio quality, which could thus benefit from optimisation. Similarly, image and video results are limited due to factors such as the glare and tint of the device's screen. Depending on the consumer application the mobile device 16 is used in, it may however be desirable to output a media object 28 having the highest quality possible. For this purpose, the technical limitations of the mobile device 16 and attributes of the media object 28 may be adjusted to produce an optimised output that meets standards of quality.

Quality evaluation techniques of media objects as in 28 are typically based on metrics, which can be measured objectively and automatically evaluated by a computer program in order to predict perceived quality. Typically, these methods are classified based on the original signal (generally not compressed), which is considered to be of high quality. No-reference quality assessment, in which the quality of an object as in 28 is evaluated without using any reference, can also be performed. The most traditional means of evaluating quality of media objects include computation of the Signal-to-Noise Ratio (SNR) (ratio of a signal power to the noise power corrupting the signal and affecting the fidelity of its representation) and/or Peak Signal-to-Noise Ratio (PSNR) (ratio of the maximum possible signal power to the power of corrupting noise) between the original and the compressed signal. More precise metrics, such as Czenakowski Distance (CZD) (estimates the quality by measuring differences between pixels) and Structural Similarity (SSIM) index (measuring of image quality based on an initial uncompressed or distortion-free image as reference) for evaluating image or video quality for example, may also be applied.

Still referring to FIG. 3 in addition to FIG. 1 and as mentioned herein above, the optimisation process implemented by the optimisation algorithm illustratively comprises an initial stage, during which an optimised output of a media object 28 of a given category rendered on the mobile device 16 is determined. The optimisation process further comprises a subsequent stage, during which the media object 28 intended for delivery to the mobile device 16 is optimised by adjusting its attributes, such that its output on the mobile device 16 conforms to the predetermined optimised output, thus improving the quality.

In particular, in the initial stage, an optimised output of a media object 28 of a given category is determined for example using a subjective quality assessment method. Indeed, since it is desired to enhance the quality of the user's experience, it might prove desirable to supplement objective quality measures with subjective assessment of the object's output quality, which would prove more accurate in this application. Still, as will be apparent to a person skilled in the art, the optimised output may be determined through objective measurements described herein above solely (i.e. without having recourse to subjective measurements). Subjective quality measurements, such as the Mean Opinion Score (MOS) used by the International Telecommunication Union (ITU), assess the quality of video or audio sequences based on human opinion. The MOS provides a numerical indication of the perceived quality of received media after compression (using codecs) and/or transmission to a mobile device as in 16. The MOS is typically generated by averaging the results of a set of standard, subjective tests where a number of members of a test pool rate the quality of test sequences (video or audio) presented on a mobile device as in 16. The MOS is an arithmetic means of all individual scores and is typically expressed as a single number ranging from 1 (lowest perceived quality with objectionable distortion) to 5 (highest perceived quality with imperceptible level of distortion).

Still referring to FIG. 3 in addition to FIG. 1, in order to determine the optimised output for an object 28 of a given category, a plurality of mobile devices 28 is illustratively tested using a method similar to the MOS measurement. For this purpose, a plurality of test media objects 28 of a given category having different attributes are delivered to a plurality of mobile device as in 16 representative of the types of mobile devices available on the market. The objects are then rendered on the mobile devices for assessment by at least one member of a pool of individuals (not shown), which perceive (i.e. listen and/or view) the object 28 featured by the mobile device 16 during a test session. For example, a plurality of video sequences having different attributes affect the individual's perception of the object's quality (e.g. different levels of contrast for the stream of images and different levels of sound quality for the audio component of the video sequence), is transmitted to and rendered on a plurality of types of mobile devices 16 for perception by the test pool. The members of the test pool then rate the quality of the object 28 featured on each type of mobile device 16. For example, for each video sequence rendered on the device 16, they assess how well it is featured on the display 18 and whether the quality of sound is adequate.

According to the observations of the test pool, the object 28 having the highest quality rating is identified as the one providing the optimised output and attributes of this selected object 28 are stored in the database 14 together with the type of mobile device for cross-reference. For example, the attributes (e.g. colours, contrast) of the video sequence, which was rated by the test pool as having the highest quality are stored in the database 14 for subsequent use by the optimisation algorithm invoked by the optimisation function 32 when optimising an object 28 of the video category for delivery to the mobile device 16.

Still, the optimised output may also be determined objectively through a similar experimental analysis without having recourse to subjective measurements. In the latter case, the quality of output rendered by a media object 28 of a given type on each type of mobile device 16 would be assessed using the objective metrics described herein above (e.g. SNR or PSNR). The analysis would also comprise a further selection component in order to identify the media object 28, which results in an optimised output. Whenever a new technology or a new mobile device enters the market, a new analysis can illustratively be carried out and the results incorporated in the database 14.

Still referring to FIG. 3 in addition to FIG. 1, the optimisation function 32 of the server 12 subsequently retrieves the type of the mobile device 16 from the database 14, from which an object 28 of a given type can be optimised for delivery. The optimisation is done by adjusting the object's attributes in such a manner that they conform to the attributes of the predetermined optimised output for the given object type, as stored in the database 14. As a result, once delivered to the mobile device 16, the optimised object 28 will provide an optimised output when rendered on the mobile device 16. The user of the mobile device 16 therefore perceives the rendered object 28 as having high quality, thus enhancing the overall experience. For example, if the user purchased a video from a retailer's website, the video will be optimised by adjusting its attributes (e.g. contrast, sound quality) to conform to those of the object 28 of the video category, which resulted in an optimised output, as determined during the testing phase described herein above.

In particular and still referring to FIG. 3 in addition to FIG. 1, the attributes adjusted by the optimisation algorithm of the optimising function 32 vary according to the object category. For example, for objects 28 of the image category, these attributes may comprise at least one of the image's orientation, the colours and shades of the image, or the contrast between colours of the image. An animated version (e.g. moves, rotates) of the image could also be transmitted to the mobile device 16 instead of a still image, if the device 16 has sufficient capabilities to support such an object. For objects 28 of the audio category, the attributes may comprise of the speaker's frequency response, the signal amplitude, frequency envelope, or sound clip duration. In the latter case, the optimisation may be achieved by implementing volume normalization, in which the signal amplitude is increased. Bandwidth compression (also referred to as equalization), in which the frequency envelope of the signal could be changed by increasing or decreasing the sound volume of selected frequencies, could also be implemented. Also, given the memory capacity of the mobile device 16, the duration of an audio object 28 delivered thereto could be adapted, such that a shorter or longer audio component is transmitted. In this case, a user of a mobile device 16 having high performance characteristics will receive an object 28 having the highest content (longer audio component) while a user of a mobile device 16 having lower performance will receive an object 28 having content adapted for his device (shorter audio component), thus allowing for all users to have an enjoyable experience, regardless of their device type.

As will be apparent to a person skilled in the art, the present invention has the advantage of allowing for dynamic optimisation of the object 28 in the sense that once object as in 28 of a given category is optimised by the server 12 and delivered to the mobile device 16, upon subsequent optimisation of another object of the same category (e.g. in response to the user purchasing another object), the server 12 simply uses the previously optimised object 28 as a basis from which a new object 28 is optimised.

Figure 4:
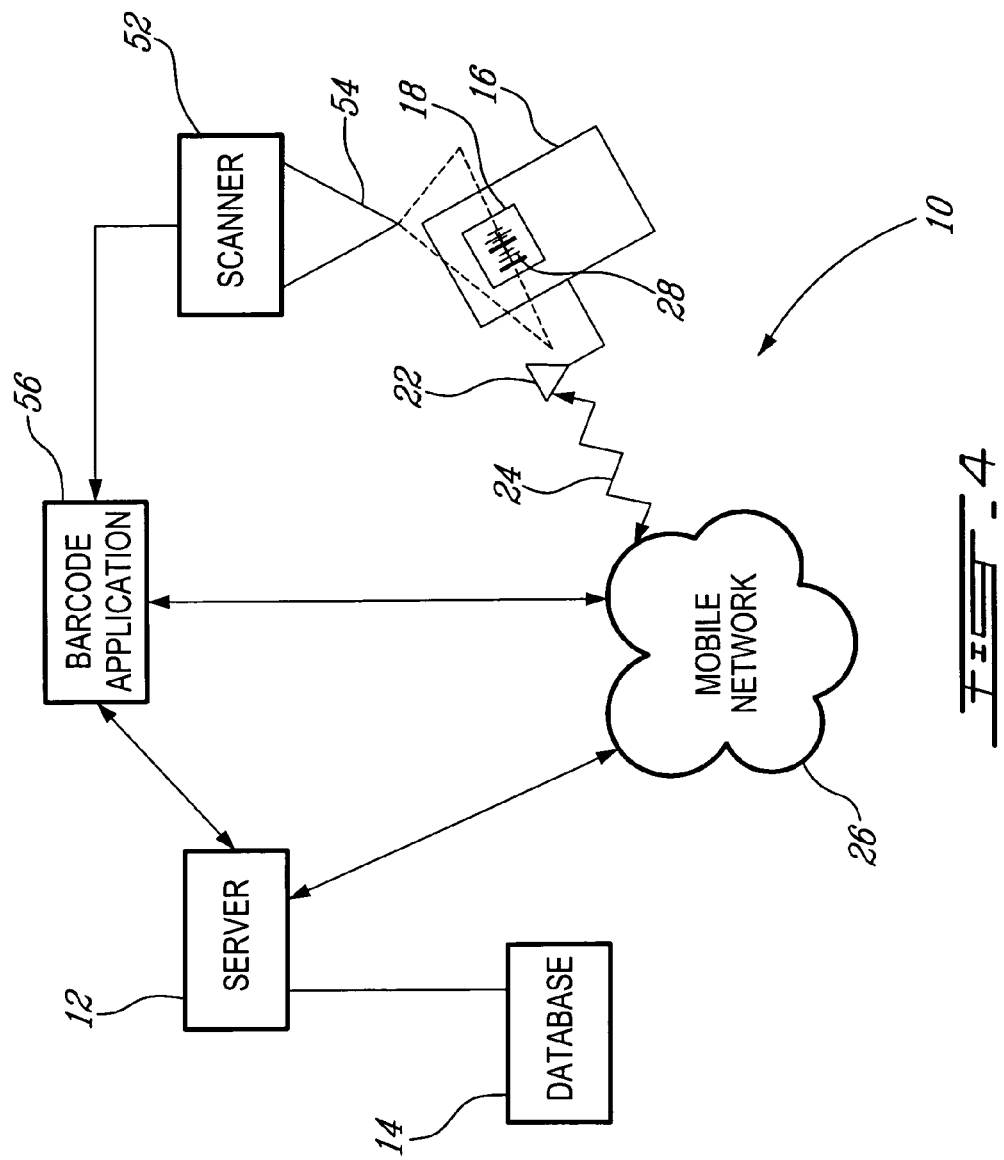
FIG. 4 is a schematic diagram of a system for generating a media object of the barcode image category for transmission to the mobile device and display on the device's screen in accordance with an alternative illustrative embodiment of the present invention.
Figure 5:
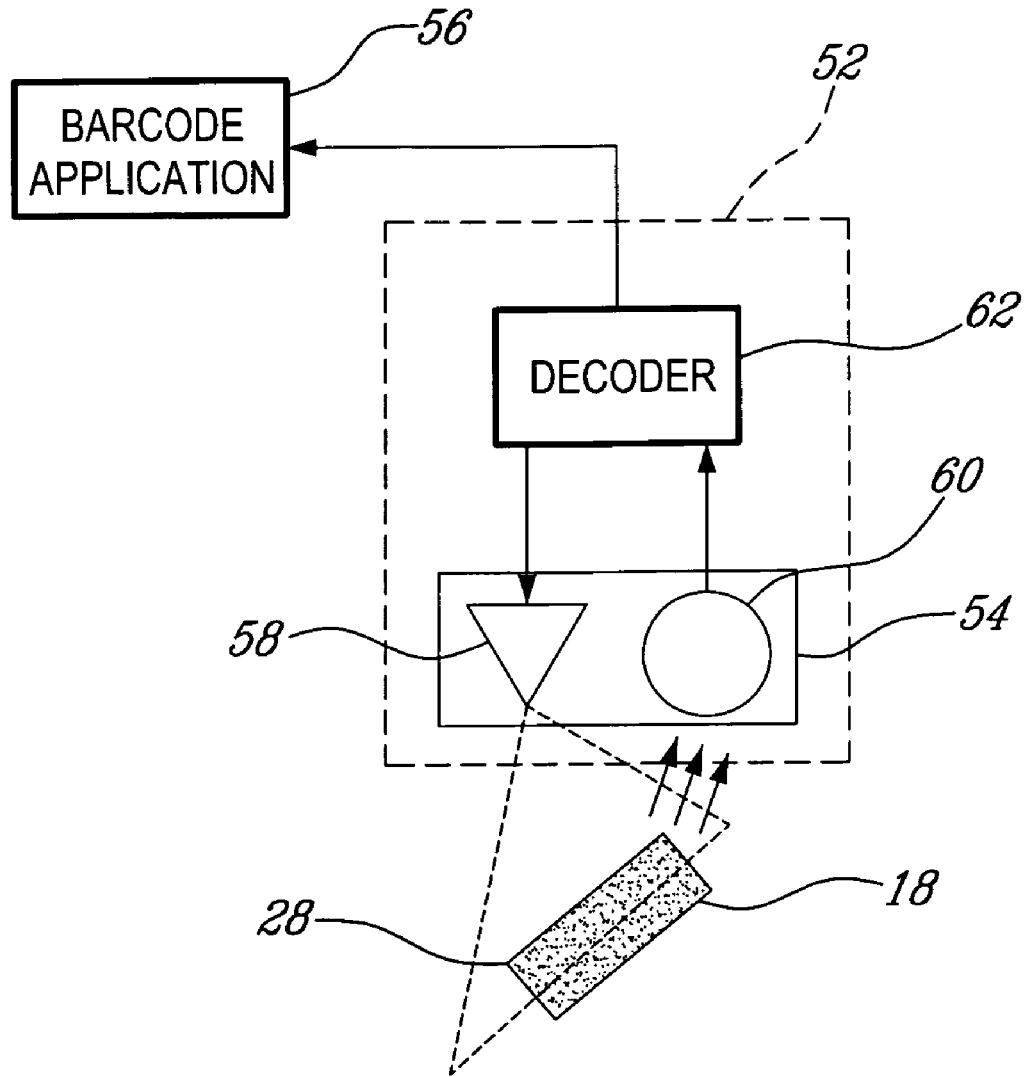
FIG. 5 is a schematic diagram of the scanning device components in accordance with an alternative illustrative embodiment of the present invention.

Referring now to FIGS. 4 and 5, in an alternative illustrative embodiment of the present invention, the object 28 transmitted to the mobile device 16 is a barcode image intended to be displayed on the display 18 and read by a scanner 52 comprising a scanning head 54. As will be apparent to a person skilled in the art, a variety of consumer applications such as retail coupon and ticket applications may be based on barcodes. Holding the display 18 opposite the scanning head 54 (for example a laser or video camera or the like) allows the displayed barcode 28 to be captured by the scanner 52 and subsequently transmitted to a barcode application 56 once decoded. The scanning head 54 typically comprises a light source 58 such as a laser and a detector 60 for sensing light emitted by the light source 58 and reflected by the barcode 28 displayed on the display 18 of the mobile device 16. Additionally, the barcode reader 52 typically includes a decoder 62 for processing the gathered barcode information for a given application (for example, retail application using a specific type of scanner 52).

Still referring to FIGS. 4 and 5, in order to improve the quality of the displayed barcode 28 such that when presented to the scanner 52 it is properly scanned during the scanning process, it is desired for the barcode 28 to have attributes which satisfy standards for accurate readability of the barcode. Such attributes include the minimum bar width, which refers to the width of the narrowest barcode element (bar or space). The larger the width of the elements, the more space it takes to print (or display) the barcode and therefore, the lower the bar code density. Lower density barcodes are more consistently read than higher density barcodes, as minor variations (due to printing or damage) have a greater negative impact on high density bar codes, where the width of the elements is smaller. Another important attribute of barcodes is their physical length, which determines how long scan lines must be and how accurately they must be oriented with respect to the barcode. The barcode height (dimension parallel to the bars) determines the angular accuracy required in orienting the scan line relative to the barcode, with a large range of angles (e.g. from −30 degrees to 30 degrees) minimizing the risk of reading failure. Contrast, which is a measure of the reflectance of the bars and spaces, is another important factor that can affect the readability of the barcode symbol. Although the attributes defined herein above refer mostly to 1D barcodes (bars and spaces), it should be noted that they can be extended to 2D barcodes as well, although it should be noted that in 2D barcodes it is other parameters such as the size or presence of a cell and not the width of the bar which is used to encode the information.

The colour of the barcode 28 is another important attribute. Indeed, varying the colour can increase the amount of information represented (e.g. for 3D barcodes) or improve the decoding of the barcode and thus the success rate of the scanning process.

Another attribute to take into consideration is barcode quality, which includes the quality of printing/display of the barcode and the quality of the surface on which the barcode is printed/displayed. The better the quality of both, the easier it will be for the scanner 52 to successfully read and decode the barcode 28. In reference to the media on which the barcode is to be displayed, surface reflectivity and transparency are important factors to take into consideration in order to improve readability of the barcode by the scanning device. Indeed, a surface that is too shiny may reflect so much light that at near-perpendicular angles, the scanner may be overloaded, while at large scan angles, the mirror-like reflection may send little light back to the scanner. In contrast, a dull or matte surface provides a diffuse or broad pattern. Also, if the media is too transparent, the underlying surface affects the reflectivity. When contact devices are used, the durability of the media, or how many times the barcode reader can be moved across the surface without degrading its reflectivity, should also be evaluated.

Based on the above factors, the performance of the barcode symbology can be evaluated using measures such as the first pass read rate (FRR) and the second pass read rate (SRR). The FRR is the ratio of the number of times in which a good read occurs on the first try, divided by the number of attempts. The SRR is the ratio of the number of times in which a good read occurs in two or fewer tries, divided by the number of attempts. Barcodes of good quality should achieve at least an 85% FRR and at least a 99% SRR.

Illustratively, and referring back to FIG. 3 in addition to FIGS. 4 and 5, an optimised output of media objects 28 of the barcode category is determined through experimental analysis similarly as with objects 28 of other types. In particular, an extensive variety of mobile devices 16 and scanners 52 is tested in order to ensure that the barcode image that will be optimised by the server 12 will comply with readability standards mentioned herein above and will thus be read and decoded properly by the barcode scanner 52 when rendered on the mobile device 16. Indeed, as the type of scanner 52 used has an impact on the performance of the scanning process, a plurality of scanners 52 need generally to be tested in order to assess the impact of various mobile and scanning device attributes (e.g. display size and type, scanning device configuration and model) on the readability of the barcode image displayed. It may be further possible to identify which barcode images are best suited for display on a specific mobile device as in 16 and for reading and decoding by a specific scanning device 52. For this purpose, a plurality of barcode images having different attributes (e.g. barcode sizes and generating schemes) are delivered and rendered on the mobile devices 16 and the optimised barcode image attributes, which result in an optimised output (i.e. the optimal readability) are identified. The results of this analysis are parameterised, cross referenced to the type of scanner 52 and mobile device 16 and stored in the database 14 for subsequent use by the optimising function (reference 32 in FIG. 2) in optimising the barcode image for a given scanner 52/mobile device 16/application combination, thus allowing for a maximized readability range and decoding success rate.

Illustratively, the environment of the scanner 52 within a particular application is also analysed in order to identify which environmental parameters (such as ambient light and the like) affect the reliability of the scanning process and how. These simulations can be performed in a laboratory environment or alternatively in the environment where the system will be used (e.g. a supermarket or other retail environment).

Analysis within a laboratory environment provides for improved control over the environmental criteria and therefore parameters such as the ambient light, the degree of dirt on the scanner and mobile device screens, the scanning angles, and the distance between the mobile and scanning devices can be freely adjusted. In the environment where the application will be deployed, analysis is performed to evaluate the reliability of the barcode. System ergonomics (i.e. interaction between the user, the mobile device, and the scanning device) may also be analysed with human subjects and the efficiency of the barcode generation and scanning process is evaluated. Based on the results of the above analysis, barcode attributes that need to be adjusted to generate a barcode image that is optimised for a particular scanner 52/mobile device 16 can be identified. Such attributes can comprise the optimal cell size and colours of the barcode and are identified through statistical analysis and interpolation methods.

Still referring to FIGS. 4 and 5, where the media object 28 is a barcode image, it may be desirable for the optimisation function 32 of the server 12 to not only optimise the object but also generate the barcode image prior to optimisation. For this purpose, the server 12 encodes data for transmission to a given mobile device 16 in barcode format by first determining the scanner 52 being used for the particular application as well as the type of mobile device 16 being used to display the barcode image 28. Additionally, the data to be encoded may illustratively be provided by the barcode application 56, but in a given implementation may also be transmitted directly from the mobile device 16 to the server 12 for processing. In this case, as the data to be encoded into a barcode image may or may not have been stored on the mobile device 16, the data may typically be encrypted to ensure security of data transfer. In order to generate a barcode representative of the data to be transmitted, the server 12 may use a generating scheme, which will maximize the reliability of the scanning process for the receiving mobile device 16 and the barcode reader 52 used in the current application, as identified in the database 14 from the experimental analysis described hereinabove. For example, if the scanner 52 that will be used to read the barcode image only supports 1D barcodes and the barcode will be displayed on the mobile device 16 in a retail application, the optimising function 32 will retrieve the 1D barcode scheme best suited for use in retail environments, in this case the UPC code, and encode the data using this scheme from the database 14.

Similarly to objects 28 of other categories, upon retrieving specific information related to the attributes of the receiving mobile device 16, the scanner 52 and application from the database 14, the server 12 optimises the barcode object 28 for reliable reading and decoding by the scanner 52 from the display 18 of the mobile device 16. Indeed, as is the case for other types of objects as in 28 delivered to the mobile device 16, knowledge of the retrieved information will enable the optimising function 32 to deliver a barcode image 28, which produces an optimised output on the selected receiving mobile device 16, thus improving the chances of adequate reading of the displayed barcode by the scanning device 52. Information related to the scanner 52 and the application stored in the database 14 illustratively includes model and configuration of the scanner 52, types of barcodes supported, average distance between the mobile device screen and the barcode reader, and ambient lighting conditions.

In an alternative illustrative embodiment of the present invention, instead of an a priori analysis being carried out on a variety of mobile devices, scanners and/or scanning environments, the mobile device 16 could provide all or a portion of the information necessary for correct optimisation of the barcode image to the barcode server 12. As a result, the database 14 would either prove to be no longer necessary or alternatively would contain only a portion of the data otherwise required to optimise the barcode image.

Illustratively, the optimisation algorithm within the optimising function 32 optimises the barcode by varying the barcode attributes that will conform to the optimised output determined in the testing phase described herein above, thus ensuring a maximized scanning reliability and success rate when the barcode image 28 is displayed on the receiving mobile device 16, as again identified in the database 14 from the experimental analysis. For this purpose, according to the technical characteristics of the mobile device 16 and the properties of the application, the algorithm modifies different barcode attributes such as colours and shades, contrast, cell size (changing the number of pixels that represent a single cell), and length and spacing of bars. For example, if the device on which the barcode image 28 will be presented has a 2 inch, 262 k colour, 240×320 pixels display and the testing results stored in the database for this device model show that an ideal barcode presented on this display should have a cell size x with bars of length y and spacing z, the barcode image 28 is adjusted accordingly to the sizes x, y, and z. In another embodiment of the invention, an error correction algorithm may be implemented by the optimising function 32 on top of the bar code optimisation mechanism in order to maximize the strength of the code. In this case, the error correction algorithm takes additional parameters such as the amount of data to be encoded, the coding rate and the size of the pixels into account to detect, localize and correct errors.

In a further embodiment of the invention the bar code image is animated to facilitate its detection by the scanner 52. For this purpose, the size of the barcode image 28 varies progressively with time, either shrinking or stretching. Again, the rate of variation, i.e. the speed at which the barcode image is shrunk or stretched, is determined through previous experimentation and depends on the model of the scanner 52 and mobile device 16. Depending on the capabilities of the mobile device 16, the barcode image 28 can also be moved from left to right and top to bottom as well as rotated in order to assist the scanner 52. In this embodiment, the optimising function 32 can generate an animated image instead of a still image and a video file that will be further transmitted to the mobile device 16.

In still another embodiment of the present invention, if the optimisation algorithm within the optimising function 32 determines that the device 16 is unsuitable for displaying all of the data which would otherwise need to be encoded into the barcode image 28 (for example, due to a limited size of the display 18 of the mobile device 16 or the like), the optimising function 32 can decide to either, for example, limit the amount of information which is encoded into the generated barcode image 28 or supply the mobile device 12 with a series of barcode images which can be displayed and scanned by the barcode scanner 52 individually. In the former implementation the user of the mobile device 16 could be subsequently requested by the suitably equipped barcode scanner 52 to enter the missing data (for example, via a display and keypad, not shown, attached to the barcode scanner 52).

In another embodiment of the present invention, the optimising function 32 could send additional information or commands to the mobile display 18 in order to optimise the display of the barcode image 28 on the mobile device 16. This additional information or commands could include, for example, a command to adjust the contrast of the display, to turn on backlighting or to maintain the backlighting illuminated for a given period of time.

Still referring to FIGS. 4 and 5 in addition to FIG. 1, after the object attributes are optimised and the final object 28 (barcode image or other) is established, a file that is compatible with the characteristics of the receiving mobile device 16 is generated by the message builder 34 for delivery to the mobile device 16. For example, if a still image is transmitted to a mobile device as in 16, which supports jpeg files only as identified in the database 14, the message builder 34 generates a jpeg file representing the object 28. The file corresponding to the generated object 28 is then transmitted to the receiving mobile device 16 in the most efficient manner using standardized transportation protocols regardless of the object type (i.e. barcode image or other).

Still referring to FIG. 1, in order to transmit the object 28, the message builder 34 illustratively checks the database 14, which illustratively includes information as to the access protocol supported by the mobile device 16. Illustratively, the object 28 is transmitted via the communication module 30 to the device's MAGI 36 in the most efficient manner using the Short Message Service (SMS), Multimedia Messaging Service (MMS) or Wireless Application Protocol (WAP) push protocols, depending on the object, the application and on the characteristics of the mobile device 16. For example, if the mobile device 16 supports MMS only, the protocol used to transmit the message will be MMS. As known in the art, MMS is a standard for a telephony messaging systems that allow sending messages that includes multimedia objects (images, audio, video, rich text) and not just text messages as in SMS. Also as known in the art, Wireless application protocol (WAP) is an application environment and set of communication protocols for mobile communication devices designed to enable manufacturer-, vendor-, and technology-independent access to the Internet and advanced telephony services. WAP Push is an evolution of WAP, which is a specially encoded message including a link to a WAP address that allows WAP content to be pushed to the mobile device. Near Field Communication (NFC), a short-range high frequency wireless communication technology, which enables the exchange of data between devices over about a decimetre distance, could also illustratively be used. In this case, the object 28 could be transmitted to the mobile device 16 using the Bluetooth communications protocol for example. In an illustrative embodiment of the present invention, the network and transmission methods are therefore selected to be optimal depending on the phone number of the mobile device 16 and on the type of message protocol supported.

Still referring to FIG. 1, once the object 28 is transmitted to and received by the mobile device 16, it is rendered on the device's output (i.e. the screen 18 and/or the speakers 20). Since the object 28 is specifically optimised for the user's mobile device 16 not only to overcome the technical limitations but to advantageously provide the user within optimal experience, it is rendered on the mobile device 16 and perceived by the user with the most favourable quality. As mentioned herein above, in the event where the delivered object 28 is a barcode image, it is typically scanned by the barcode scanner 52. In this case, since the barcode image 28 is optimised, the scanner 52 scans and decodes it reliably and the encoded information can therefore be retrieved efficiently and accurately for redemption of the barcode. As discussed above, depending on the application, this information can be used to purchase an item such as a plane ticket or grocery item or order a service such as the debit of a prepaid account after authentication of the user through the barcode presented.

Referring back to FIG. 3 in addition to FIG. 1, in an illustrative embodiment of the present invention, the transaction may be initiated at step 102 from a variety of entry points available to the user. Indeed, access to a retailer's website can be initiated not only from the mobile device 16 but also from a separate device (not shown) such as a terminal located at the point of sale or a computer. In the latter case, the user for example selects the object 28 to be purchased and is subsequently prompted to supply information related to the mobile device 16, in particular the phone number associated there-with. Upon receiving the phone number, a transaction is initiated directly on the mobile device 16 and an optimised object 28 is delivered to the latter, upon confirmation by the user that the object 28 is indeed intended to be sent to the mobile device 16.

In another illustrative embodiment of the present invention, the customer can access the website and select the object 28 to be purchased directly from the mobile device 16. Alternatively, the customer may send a keyword or the like (seen in a television advertisement for example) by text message, illustratively in SMS, to a selected short code via the mobile device 16 in order to purchase a desired object 28. In these last two examples, the transaction is initiated on the customer's mobile device 16 directly and, the customer therefore need not be prompted for information related to the equipage of the mobile device 16 except for a confirmation that the transaction is to be sent to the mobile device 16. It is therefore apparent that the present invention has the advantage of not requiring the customer to supply extensive information, for example in the form of a device model number, carrier or the like.

Moreover, the present invention allows for combinations of objects as in 28 of different categories to be delivered to the mobile device 16 for a variety of applications. Indeed, although it would be typical to deliver standalone optimised objects 28 such as audio clips, videos or still images to the mobile device 16, the features of MMS (i.e. offering multipart messaging) could advantageously be used to deliver combinations of objects 28 from different categories. For example, it would be possible to deliver a musical greeting card consisting of an optimised still image combined with an optimised audio track instead of delivering standalone objects.

Although the present invention has been described hereinabove by way of specific embodiments thereof, it can be modified, without departing from the spirit and nature of the subject invention as defined in the appended claims.

We claim:

1. A method for preparing and delivering a media object of a category of media object to a selected one of a plurality of mobile devices, each of the mobile devices of a different mobile device type and comprising an output, the method comprising:
    at a first stage, for each type of mobile device, determining an optimised output of the category of media object when the category of media object is rendered on the output of the type of device;
    at a subsequent stage:
        retrieving the mobile device type of the selected mobile device;
        optimising the media object based on said retrieved mobile device type and according to said determined optimised output for the category of the media object;
        delivering said optimised media object to the selected mobile device; and
        rendering said optimised media object on the mobile device output;
    wherein determining an optimised output of the category of media object comprises acquiring a plurality of test mobile devices, one of each of said test mobile devices representative of one of the different mobile device types, testing the plurality of test mobile devices, said testing comprising rendering a plurality of test media objects of the category of media object on the output of each of the test mobile devices, the plurality of test media objects having different attributes, rating the quality of the output of said rendered test media objects for each of the test mobile devices to determine the optimised output of the category of media object on each of the test mobile devices, and storing said attributes of the rendered media object resulting in the determined optimised output together with the type of test mobile device and the category of media object.

2. The method of claim 1, wherein the mobile device type of each of the plurality of mobile devices is stored in a database and further wherein retrieving the mobile device type comprises retrieving the mobile device type of the selected mobile device from said database.

3. The method of claim 1, wherein optimising the media object comprises adjusting attributes of the media object, such that when said optimised media object is rendered on the mobile device output, said rendered optimised media object conforms to the determined optimised output of the category of media object.

4. The method of claim 3, wherein for the media object, the attributes to be adjusted are selected from the group comprising of a colour of said media object, a shade of said media object, a contrast between colours of said media object, an orientation of said media object, a signal amplitude of said media object, a signal frequency envelope of said media object, a duration of said media object, and combinations thereof.

5. The method of claim 1, wherein delivering said optimised media object comprises delivering said media object to said selected mobile device via a wireless communication link using at least one of an SMS protocol, an MMS protocol, a WAP Push protocol, or a Near Field Communication protocol.

6. The method of claim 1, wherein the mobile device output is selected from the group comprising of a display, a speaker, and combinations thereof.

7. The method of claim 6, wherein the category of the media object is selected from the group comprising of a still image category, an audio category, a video category, a barcode image category, and combinations thereof.

8. The method of claim 7, wherein the media object is an image of a barcode image category and further wherein said optimised image is rendered on said mobile device display for scanning with a scanning one of a plurality of different types of barcode scanning devices.

9. A method for preparing and delivering an image of a barcode image category of media object to a selected one of a plurality of mobile devices, each of the mobile devices of a different mobile device type and comprising a display, the method comprising:
    at a first stage, for each type of mobile device, determining an optimised output of the barcode image category of media object when the barcode image category of media object is rendered on the output of the type of device;
    at a subsequent stage:
        retrieving the mobile device type of the selected mobile device;
        optimising the image based on said retrieved mobile device type and according to said determined optimised output for the barcode image category of media object;
        delivering said optimised image to the selected mobile device; and
        rendering said optimised image on the mobile device output for scanning with a scanning one of a plurality of different types of barcode scanning devices;
    wherein determining an optimised output of said barcode image category comprises acquiring a plurality of test mobile devices, one of each of said test mobile devices representative of one of the different mobile device types, acquiring a plurality of test scanning devices, one of each of said test scanning devices representative of one of the different scanning device types, testing the plurality of test mobile devices with the plurality of test scanning devices, said testing comprising rendering a plurality of test images of said barcode image category on a display of each of said test mobile devices, said plurality of test images having different attributes, scanning said rendered test images with each of said test scanning devices, determining an optimised output of said barcode image category for each mobile device type/barcode scanning device type pair, and storing said attributes of said rendered test image resulting in said determined optimised output together with the mobile device type and the barcode scanning device type of said mobile device type/barcode scanning device type pair.

10. The method of claim 8, wherein said configurations of said barcode scanning devices are selected from a group consisting of information related to at least one of a scanning device model, a type of barcode supported, a barcode scheme, an average distance between a scanning device and a scanned mobile device, ambient lighting conditions, and combinations thereof.

11. The method of claim 8, wherein optimising said image comprises adjusting attributes selected from a group consisting of a size of cells of said image, a length of bars of said image, a width of bars of said image, a spacing of bars of said image, a colour of said image, a shade of said image, a contrast between colours of said image, a level of error correction, and combinations thereof, such that when said optimized image is rendered on said mobile device display, said rendered image conforms to said determined optimised output of said barcode image category.

12. The method of claim 11, wherein optimising said image further comprises animating said image, wherein said image moves, rotates, and gradually changes size as a function of time.

13. A system for preparing and delivering a media object of one of a plurality of categories of media objects to a selected one of a plurality of mobile devices, each of the mobile devices of one of a plurality of mobile device types and comprising an output for rendering at least one of the category of media objects, the system comprising:
 a plurality of optimised outputs for each of the categories of media objects, each of said optimised outputs associated with a respective mobile device type;
 an optimisation module, said module receiving the media object, retrieving said optimised output based on a mobile device type of the selected mobile device and the category of media object and optimising the media object based on said retrieved optimised output; and
 a wireless communication link connecting said plurality of mobile devices to said optimisation module for delivering said optimised media object to said selected mobile device;
 wherein said plurality of optimised outputs is determined by acquiring a plurality of test mobile devices, one of each of said test mobile devices representative of one of the different mobile device types, testing the plurality of test mobile devices, said testing comprising for each of the categories of media objects, rendering a plurality of test media objects on the output of each of the test mobile devices, the plurality of test media objects having different attributes, rating the quality of the output of said rendered test media objects for each of the test mobile devices to determine the optimised output for each of the categories of media objects on each of the test mobile devices, and storing said attributes of the rendered media object resulting in the determined optimised output together with the type of test mobile device and the category of media object.

14. The system of claim 13, wherein said output is selected from the group comprising of a display, a speaker, and combinations thereof.

15. The system of claim 13, further comprising a database for storing, for each of said categories of media object, said optimised outputs together with their respective mobile device types.

16. The system of claim 15, wherein said optimization module and said database are running on a server and the selected mobile device further comprises a client for communicating with said server.

17. The system of claim 13, wherein said wireless communication link uses at least one of an SMS protocol, MMS protocol, or WAP Push protocol.

18. A method for preparing and delivering a barcode image from a data set for subsequent delivery to a receiving one of a plurality of different types of mobile devices for scanning with a scanning one of a plurality of different types of barcode scanning devices, the mobile devices each comprising a display for displaying the barcode image and the scanning devices each comprising a scanner for reading the image, the method comprising:
 at a first stage, for each type of mobile device, determining an optimised output of the barcode image when the barcode image is displayed on the display of the type of mobile device;
 at a subsequent stage:
 retrieving the mobile device type of the receiving mobile device and a configuration of the scanning one of the plurality of scanning devices;
 optimising the barcode image based on said retrieved mobile device type and said scanning device configuration according to said determined optimised output of the barcode image;
 delivering said optimised barcode image to the receiving mobile device; and
 displaying said optimised barcode image on the display of the receiving device;
 wherein determining an optimised output of the barcode image comprises acquiring a plurality of test mobile devices, one of each of said test mobile devices representative of one of the different mobile device types, acquiring a plurality of test scanning devices, one of each of said test scanning devices representative of one of the different scanning device types, testing the plurality of test mobile devices with the plurality of test scanning devices, said testing comprising rendering a plurality of test barcode images on a display of each of said test mobile devices, said plurality of test images having different attributes, scanning said rendered test images with each of said test scanning devices, determining an optimised output of said barcode images for each mobile device type/scanning device type pair, and storing in a database attributes of said rendered test image resulting in said determined optimised output together with the mobile device type and the scanning device type of said mobile device type/scanning device type pair.

19. The method of claim 18, wherein said scanning device configuration is selected from a group consisting of information related to at least one of a scanning device model, a type of barcodes supported, a barcode scheme, an average distance between a scanning device and a scanned mobile device, ambient lighting conditions, and combinations thereof.

20. The method of claim 18, wherein optimising the barcode image comprises adjusting attributes selected from a group consisting of a size of cells of the barcode image, a length of bars of the barcode image, a width of bars of the barcode image, a spacing of bars of the barcode image, a colour of the barcode image, a shade of the barcode image, a contrast between colours of the barcode image, a level of error correction, and combinations thereof, such that when said optimised barcode image is displayed on said mobile device display, said displayed optimised barcode image conforms to said determined optimised output.

21. The method of claim 18, wherein optimising the barcode image further comprises animating the barcode image, wherein the barcode image moves, rotates, and gradually changes size as a function of time.

* * * * *